United States Patent [19]

Maier et al.

[11] Patent Number: 4,562,670
[45] Date of Patent: Jan. 7, 1986

[54] BENCH

[76] Inventors: Peter Maier, Gerokstrasse 1, 7311 Neidlingen; Günter Arnold, Albstrasse 5, 7441 Kohlberg, both of Fed. Rep. of Germany

[21] Appl. No.: 564,247

[22] Filed: Dec. 22, 1983

[30] Foreign Application Priority Data

Dec. 30, 1982 [DE] Fed. Rep. of Germany ....... 3248627

[51] Int. Cl.$^4$ .................... B24B 41/02; B27C 9/00
[52] U.S. Cl. .................................... 51/166 R; 51/3; 51/240 R; 144/1 G; 144/117 B; 144/253 J
[58] Field of Search ............... 51/3, 166 R, 166 TS, 51/181 R, 240 A, 240 R, 268, 273; 144/1 G, 117 B, 117 R, 286, 287, 253 J; 269/71, 901

[56] References Cited

U.S. PATENT DOCUMENTS

| 1,327,390 | 1/1920 | Josias | 144/1 C |
| 1,346,031 | 7/1920 | Josias | 144/1 C |
| 3,011,533 | 12/1961 | Newman | 144/1 C |
| 3,404,714 | 10/1968 | Runkle et al. | 144/117 R |
| 3,771,579 | 11/1973 | Heuze | 144/1 C |
| 4,201,254 | 5/1980 | Fehrle | 144/1 G |
| 4,346,536 | 8/1982 | Bryden | 51/135 R |

FOREIGN PATENT DOCUMENTS

2116550 10/1972 Fed. Rep. of Germany ..... 144/1 G

Primary Examiner—Roscoe V. Parker
Attorney, Agent, or Firm—McGlew and Tuttle

[57] ABSTRACT

A bench has a driving unit on which abrading or polishing tools may be fixed. The unit is mounted on two cradles on the bench so that it may be rocked between an upright and a level position. The frame of the bench is made up of lengths of section and the bench top and the cradles may be slidingly moved thereon.

18 Claims, 7 Drawing Figures

BENCH

BACKGROUND OF THE INVENTION

The present invention relates to benches having a driving unit thereon on which a tool, such as a piece of sand paper or other grinding element may be mounted.

Such benches are used for the processing of workpieces and a sanding or polishing tool is mounted on the output shaft of the driving unit so that it may be turned by the motor of the driving unit. The work is then moved up against the tool, the frame of the bench being in most cases used for supporting and guiding the work. Known designs of benches of the sort in question, as for example sanding or polishing benches, are mostly so designed that they may only be used for a limited range of operations. The chances of changing the tool are limited and such change in the tool is only possible on making many complex changes in and adjustments to the bench. Another point is that known designs of benches are by their nature limited with respect to the size of the workpieces that they may be used for.

SUMMARY OF THE INVENTION

One purpose of the present invention is that of designing a bench of the sort in question that is straightforward in the way it is used and is simple in structure.

A further purpose of the invention is designing a workbench that may be fitted with a large number of different tools.

A still further purpose or object of the invention is designing a bench needing little or no adaptation for undertaking a wide range of different operations thereon and for supporting different sizes of workpieces.

For effecting these and other purposes of the invention the frame of the bench is made up of a section frame support, that is to say a frame made up of pieces of section, on bench legs and having at least one rocking segment or cradle, in which the driving unit is supported so that the angle of its position may be changed and furthermore there is at least one bench top, designed as a work support, which together with the cradle is slidingly supported on the section frame.

One useful effect produced by this design and which may be useful to the producer of such benches is to be seen in the use of a section frame as the skeleton of the bench, inasfar as the lengths of metal or other standard section may be readily cut to the different sizes needed for different sizes of bench, something that then makes it possible for the benches to be mass produced on a large scale simply and at an effective price. The sections of the section frame furthermore take the form of guide elements that are quite simply produced and may be used for different sliding fixtures of the bench. One of such sliding fixtures will be at least one rocking segment or cradle, in which the driving unit is supported so that it may be rocked about an axis, and another of the sliding parts will be the bench top on which the workpieces may be rested and supported while in the process of being worked upon. The driving unit may be moved in translation and changed in slope in the cradle in relation to the section frame so there are a large number of different working positions thereof. As further sliding fixtures there may be stops in the section frame, tool gripping parts, further work support plates and straight edges and the like that may be moved along as desired in the section frame. The use of lengths of section for building up the frame with a supporting and guiding function gives the user the further useful effect that such a frame may be made larger or smaller in size quite simply so that it may be adapted to be in line with the size of the piece of material that is to be worked upon.

Further useful developments of the invention are to be seen in the claims.

In keeping with one such further outgrowth of the main idea on which the invention is based, the driving unit is able to be rocked in the cradle between two home positions in which its shaft is parallel to the plane of the bench and in which, in the other case, it is normal thereto. This way of supporting the driving unit so that it may be rocked through 90° makes it possible for example for the bench, in keeping with the present invention, to be used not only with grinding rollers but furthermore with a plate-like grinding or sanding element so that the bench becomes a general-purpose system.

It is furthermore possible for the driving unit to be adjusted continuously into any angle between the two home positions thereof and for it to be adjusted to a limited degree at positions beyond the two home positions. The user is then able to put the tool at any desired angle in relation to the work, a good example of this being grinding mitered parts. Because to a limited degree grinding of the work is possible at angles beyond the home positions, negative angles may be produced, this being particularly welcome in making models. Because of this the bench of the present invention may be used for a large number of different purposes.

As part of a further development of the present invention the section frame has two opposite lengthwise sections each having a rocking segment thereon and the driving unit is placed so that it may be rocked about pins placed on a common axis of rocking, such pins being drivingly joined with the cradles. The pins may be journaled in holes in the cradles and at least one cradle has a guide element that is centered on the holes, the driving unit having an actuator running in and being able to be locked in the guide element. The rocking element may be generally L-like in form with its upper arm running in a guide rail of the lengthwise section, whereas a lower arm, running out at an angle therefrom has a hole and a slot limited by edges that are centered on the hole, there being a bolt, joined to the driving unit, in the slot. The bolt may have a female screw thread to take up a locking screw for locking against the cradle. The slot may make an angle of about 90° to 120° about its center of curvature and may furthermore have separate, preferably circular, notches for indexing the driving unit in different positions. It is possible to have an angle scale next to the slot along which a pointer is moved that is joined with the driving unit to give a reading for the angle of the driving unit.

These further developments in the workbench make the design of the cradles quite simple and cheap to produce.

It is furthermore possible for the lengthwise section to be stepped so that a groove is formed therein running in the direction of its length, one limit of such groove being formed by a round guide that is at a lower level than the level of the bench plane, the top arm of the cradle having a claw-like section to be rested on the round guide at a lower level than the plane of the bench, it being designed as a support surface for a bent-down edge of the bench top.

Furthermore the bent-down edge of the bench top may be put in a lengthwise groove, the bench in this position forming a common plane with the back of the section.

With this further development of the design of the bench the parts thereof take on such a form that the cradles are placed at a lower level than the plane of the bench and take the form of a support face that comes to an end at the level of the top side of the section frame. The outcome is a common bench or table plane without having any steps or ledges likely to be in the way of the work as it is guided along on the frame of the bench.

On the inner side of the lengthwise section at a lower level than the round guide there is a guide gap taking up an ear-like structure placed parallel to and spaced from the top arm, such ear being able to be fixed on the cradle. It is furthermore possible to have at least one further groove, as for example one with a T-cross section or a dove-tail cross section, in which the stops, the tool supports and other fixtures used with the bench may be fitted.

On the outer side of the lengthwise section it is possible to have at least one groove for sliding fixtures.

In keeping with a still further possible outgrowth of the invention the lengthwise section has a generally U-like and downwardly opening cross section with the base thereof forming the top or back of the lengthwise section. The inner side is turned towards the middle of the bench frame, running downwards as a step so that a lengthwise groove is formed that is limited by a round groove, whereas the two arms of the letter U, running downwards on the two sides of the back of the section, take the form of the inner side part and the outer side part of the lengthwise section. The inner side part has a guide groove under the lengthwise groove and thereunder a downwardly open first T-section groove and at a lower level and out of line in an outward and lower level that is a further second T-groove that is open sideways in an inner direction. The outer side part has a third T-groove, that is at a lower level than the back of the section and is open in an upward direction, and at a lower level than this there is a sideways and outwardly opening fourth T-groove and at its downwardly facing end part there is a downwardly opening groove with a L-cross section.

The U-cross section of the lengthwise section has a sloping wall against which the bench legs are rested. The lengthwise section may be an aluminum extrude.

With a lengthwise section designed on these lines the number and the placing of its grooves make it possible for a number of different sliding fixtures to be mounted and guided at one and the same time so that the range of uses of the bench is still further increased. The fact that the lengthwise section has a sloping support face for the legs of the bench makes the bench more stable. The manufacture of the lengthwise section of aluminum gives useful effects from the point of view of manufacture and furthermore the bench of the invention will then be light in weight so that it may readily be transported from place to place.

As a further development of the design of the bench of the invention, the drive unit it so placed that in the one home position in which the shaft of the motor is upright, the drive unit is at a lower level than the plane of the bench. This makes it possible for bench tops of the right design to be moved over the drive unit as far as a point right next to whichever tool is being used in a given operation. On the one hand the driving unit is then fully guarded and on the other hand the top part of the bench is very simple in use.

The driving unit may be so designed that a flat radial grinding element and a grinding roller may be placed separately or together on the shaft of the driving unit, the outcome then being a combination tool system, that makes it possible for the bench of the present invention to be used for a large number of different grinding operations.

It is furthermore possible to have a housing matching the tool that is to be fixed on the shaft of the driving unit, such housing being able to be fixed on the cradle or on the driving unit for covering the tool while it is in operation and so that a part of the surface thereof extends out of the housing. This housing may have two wings on the two sides of the tool, such wings functioning as stop faces when the tool is upright and functioning as support faces for a workpiece when the tool is on the level of the table. Furthermore the wings may be placed in two parallel planes in the form of two guides for work that is being pushed past the grinding element to take off a layer along the length thereof, the distance between the wings being the same as the depth of cut into the work.

It is furthermore possible for the housing to take the form of a guard hood and for it to have a connection for joining it up with a means for drawing off air or for spraying a liquid.

Such a design of the housing is for stopping injury of the person using the bench and damage to the work. A useful effect is produced if the guard housing or hood is joined up with a system for the aspiration of dust or for spraying in a lubricant so that the range of possible uses of the bench in keeping with the present invention is again increased.

Further details and useful effects of the invention will be seen from the account now to be given of working examples thereof using the figures herein.

DESCRIPTION OF THE PREFERRED EMBODIMENTS

Figure 1:
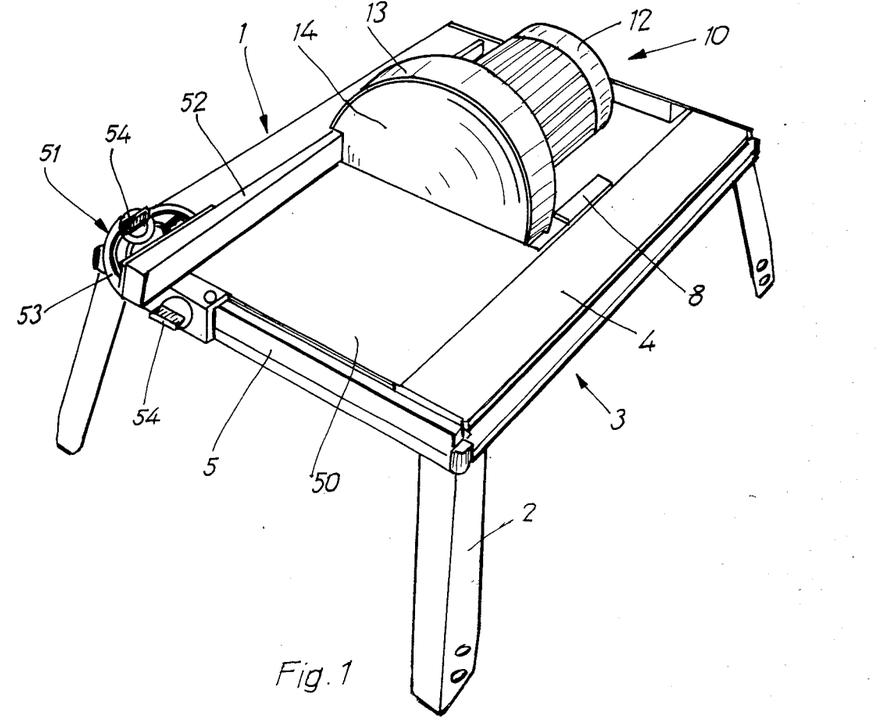
FIG. 1 is a perspective view of a workbench in keeping with the present invention with its driving unit fitted with a radial, flat grinding element.

Turning firstly to FIG. 1, the reader will see here a working example of a bench in keeping with the invention and generally designated 1. The bench has a rectangular bench or table skeleton, that is made up of a section frame 3 supported on bench legs 2. The section frame 3 is for its part made up of two opposite lengthwise sections 4, that are joined together by way of two cross sections 5 running at right angles to them. The lengthwise and the cross sections 4 and 5 come together at the corners of the bench frame and the top ends of the four legs 2 of the bench are fixed in position here. The bench legs 2 are so placed as to be running down and outwardly at a slope from the section frame 3 so that the area staked out by them on the floor is larger in size than the area of the section frame. The legs 2 of the bench are in this respect preferably splayed outwards in relation to the section frame along diagonals between a lengthwise section 4 and a cross section 5. Such a system makes the bench frame very stable in the sense that there is little change of its being pushed over. In FIG. 1 it is furthermore possible to see a preferred form of the lengthwise sections 4, they being markedly greater in breadth than in height. Furthermore the breadth of the lengthwise sections 4 is greater than that of the cross sections 5. In this design a part of the bench plane is formed by the flat section backs 6 of the lengthwise sections 4, the top face of a bench top 50 being placed in this plane as well, said top 50 stretching over the section frame 3. The bench top 50 is slidingly guided on the section frame 3. This is better seen in FIG. 4. The top 50 and the section backs 6 of the lengthwise sections 4 have the function of a support surface for work (not in the figure) in the process of being machined. For guiding the work on the plane of the bench there is a stop 51, that for its part is slidingly fixed to the outer side of a cross section 5. On the stop 51 there is a rail 52, whose lower side rests on the plane of the bench and which may be rocked in a joint piece 53. For locking the stop 51 in a given position on the cross section 5 and for locking the rail 52 in the joint piece 53, use is made of sprags. Of these, in FIG. 1 it is only possible to see the locking screws 54.

Right next to the top 50 of the bench and the stop 51 there is a driving unit 10 that is supported in the section frame 3. The driving unit 10 is made up of a motor 12 for driving a shaft that is so designed that tools may be fixed thereto. The shaft comes to an end in a tool head 13, on which, for example, a turning face plate 14 may be fixed. In the case of this set-up of the bench in keeping with the present invention this face plate 14 is more particularly used for a grinding or cut-off function. To this end a piece of abrasive paper, a file in the form of a disk or an abrasive non-woven material is fixed on the face plate 14, for example by adhesive or by screw means, so that a grinding wheel with a radial grinding face is produced. Furthermore a cut-off ring of abrasive material may be fixed on the edge of the face plate 14 so that same may then be used for cutting off lengths of stock or for slotting workpieces. In a preferred and useful form of the invention the cut-off ring is mounted on the face plate 14 together with a further abrasive means so that the user has a dual-purpose tool, that is to say a cut-off and a surface grinder. In a further possible form of the invention, (see FIG. 2) a sleeve support 15 is mounted on the tool head 13, said support 15 being driven by the shaft of the driving unit 10 so that grinding sleeves made of abrasive paper, sheet metal with filing properties and/or disks of non-woven material for grinding purposes may be fixed for the purpose of undertaking grinding and abrading operations. On the same lines it is possible for polishing operations to be done if very fine sand paper or the like is fixed on the faceplate. In place of a turning face plate 14 or a turning sleeve support 15 is it possible for a buff or brush with bristles of metal or sisal to be fixed on the driving unit 10. Furthermore other tools may be used.

Figure 2:
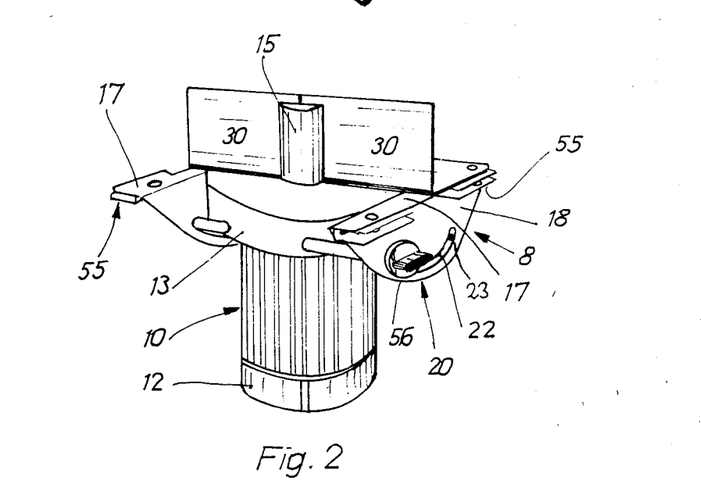
FIG. 2 is a view of the driving unit of the system of FIG. 1 as supported in the cradles, the unit having been rocked through 90° and being fitted with a grinding roller.
Figure 3:
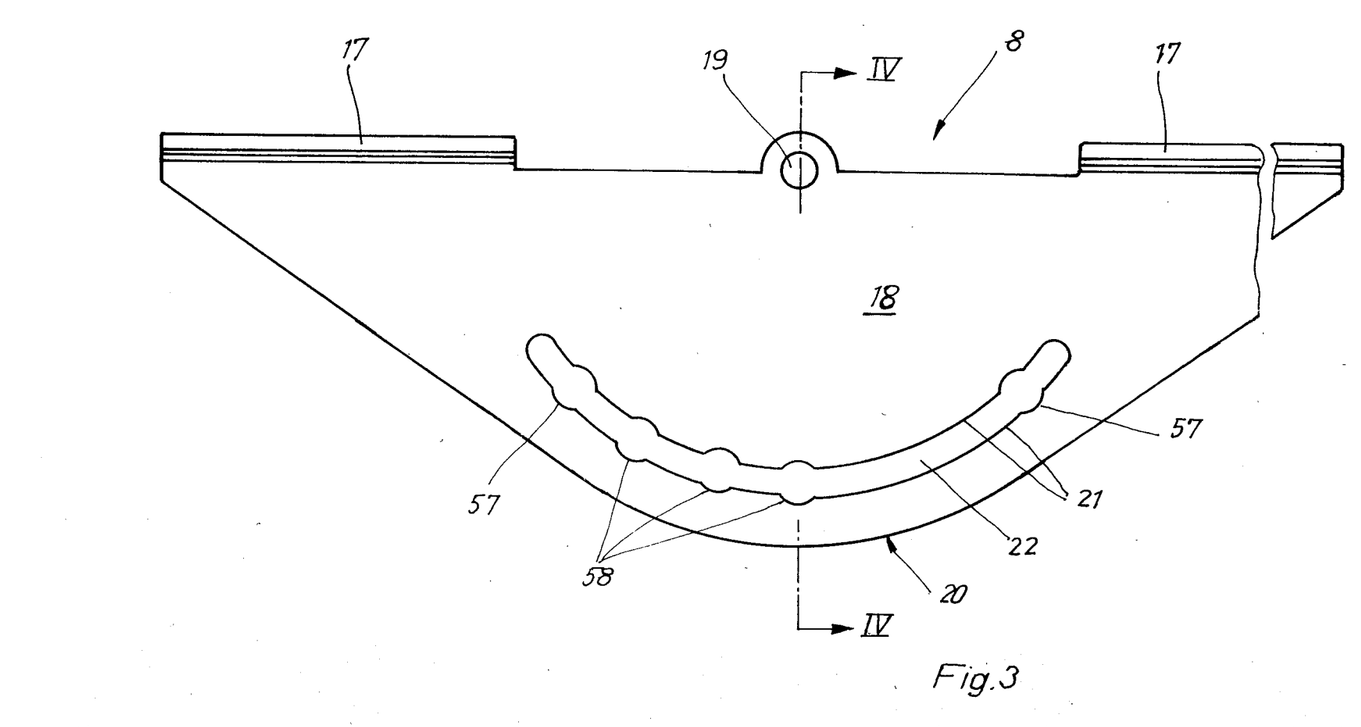
FIG. 3 is a side elevational view of a cradle.

The driving unit 10, that may be fitted with different tools so that it has a wide range of different uses, is in keeping with the present invention supported on cradles 8 so that it may be turned and the cradles themselves are slidingly guided on the section frame 3. The driving unit 10 is able to be rocked between two home position in the cradles 8 so that in the one case its shaft is parallel (see FIG. 1) to the plane of the bench top or in the other case is normal thereto (see FIG. 2). A further point is that the driving unit 10 may be continuously moved between these two home positions and through a certain range of angles and beyond these home positions and may further be locked at any given angle to which it may be moved. Turning to FIG. 1 and FIG. 2 it will be seen that for this purpose there is one cradle 8 on the two opposite lengthwise sections 4 of the section frame 3, each such cradle being able to be moved along parallel to the lengthwise section 4 in the plane of the section frame 3. In this respect the cradle 8 or segment has a generally L-like form, it having a top arm 17 running along in a guide rail of the lengthwise section 4. As may be seen from FIG. 2, the outer end of the top arm 17 is bent in the form of a claw. Moreover ears 55 are mounted on the cradles 8 so as to be parallel to the top arm 17 thereof and under same, said ears functioning as means for keeping the system in position on the lengthwise sections 4, as will be made clear in more detail hereinafter. A useful effect may be produced if the cradles 8 have means on their top arms 17 to make it possible for the cradles 8 to be locked against the lengthwise sections 4. This may be done for example by the use of sprags (not in the figure) with locking screws. A lower arm 18 is bent out from the top arm 17 of each cradle 8, said lower arm having the function of keeping the driving unit 10 in place. In this connection attention is to be given to FIG. 3, in which the lower arm 18 is in plan. The arm 18 has a hole 19. On the driving unit 10 two trunnions 16 are formed having a common axis 11 and fitting into the holes 19, in which they may be turned. By turning about the axis of the trunnions 16 the driving unit 10 is rocked out of the plane of the section frame 3. For cutting down bearing friction between the trunnions 16 and the holes 19, use may be made if needed of a ball bearing or the trunnions 16 may be coated with a low-friction material.

The lower arm 18 of the cradle 8 furthermore has a slot 22 with edges 21 which are curved so that it is generally centered on the hole 19. This slot 22 has the function of a guide element for an adjusting part formed on the driving unit 10 and running in the slot 22, in which it may be locked at a desired position. The guide element and the adjusting part are used together for limiting the angle of slope of the driving unit 10 and for its adjustment to a given position. By locking the adjustment part the driving unit 10 is locked at the desired angle on the cradles 8. As may be seen from FIGS. 2 and 5 there are two pins 23 on the driving unit 10 having a common axis and designed for adjustment. The pins 23 are taken up in the slot 22 and are guided between the edges 21 of the slot when the driving unit 10 is rocked. The limited size of the slot 22, that in keeping with the invention is between 90° and 120° about hole 19, has the effect of limiting the angle of slope of the driving unit 10. For locking the driving unit 10 at whatever angle may be desired, there are locking means placed between the driving unit 10 and the cradles 8. In the present working example the end of the pins 23 in each case has a thread into which a locking screw 56 may be screwed so that the screw is forced tightly against the cradle 8. The screw 56 is best made in the form of a wing screw so that it may readily be tightened and loosened by hand. On turning again to FIG. 3, it will be seen that the limit of the notch 22 has spaced, particularly round, notches 57 and 58 for indexing the driving unit 10 and the tool mounted thereon in a number of different positions. Two notches 57 spaced by 90° and placed towards the ends of the slot 22 are for the end positions of the pin 23 in which the shaft of the driving unit 10 is parallel to the plane of the bench top and the other position in which it is normal to it, these being the two home positions of the driving unit. It is however to be noted that the driving unit 10 may be rocked beyond these home positions. The rest of the notches 58 are for different adjustments between the two home positions. The pin 23 may in each case be locked by the locking screw 56 not only in the positions as fixed by the notches 57 and 58 but furthermore in any inbetween position. To make it possible for the driving unit to be adjusted to given angles, there is a useful effect in having an angle scale (not shown) at the slot on the cradle 8 along which a pointer on the driving unit 10 will be moved when the angle of the driving unit is adjusted.

Figure 4:
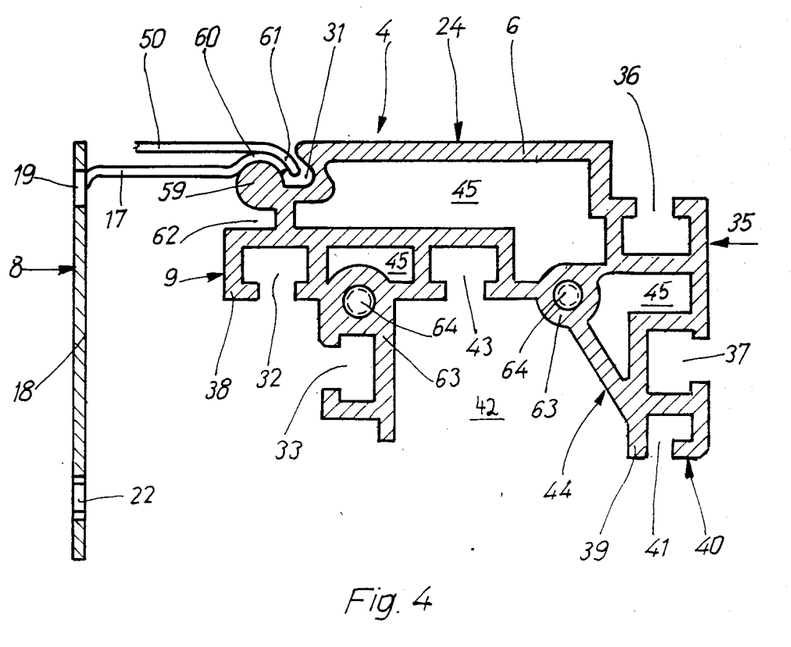
FIG. 4 is a sectional view of a lengthwise section with the cradle and the bench top, the cradle having been sectioned on the line IV—IV of FIG. 3.

Referring to FIG. 4 an account will now be given of further details of the lengthwise section 4, that may be used with good effect in the manufacture of the section frame 3. The lengthwise section 4 or girder has a flat section back 6 forming part of the plane of the bench. At the top edge, nearest the middle of the bench frame, of the section back 6 the lengthwise section 4 is stepped so that a lengthwise groove 31 is formed, that on one side has as its limit the round guide 59, that is placed at a lower level than the top plane of the bench. On this round guide or bead 59 the top arm 17 of the cradle 8 may be placed so that a claw-like part 60 is on the round guide. In this respect the claw-like part 60 is best so designed that it rests on the round guide under the level of the top plane of the bench. In this system it takes the form of a support face for the downwardly turned edge 61 of a bench top 50. The bench top 50 may be so placed on the claw-like sections that its edge 61 is fitted into the lengthwise groove 31 of the lengthwise section 4. The round guide 59 is at such a lower level under the back 6 of the section that in this position the bench top 50 is at quite the same level as the back 6 of the section, that is to say it is in the same plane as it. In the case of a preferred further development of the invention there is a guide gap 62 or groove in the inner side 9 of the lengthwise section 4 under the round guide 59. The ears 55 noted hereinbefore are fitted into this groove 62, the ears 55 being on the cradles 8. They have the function of stopping the cradles being lifted from the section frame. The cradles 8 are slidingly guided on the lengthwise sections by way of the claw-like parts and the ears 55. For locking them in their end positions as desired they are kept in position by sprags or clamps pulling them down against the lengthwise sections. In addition to the lengthwise groove 31 there are further grooves 32 and 33 on the inner side 9 of the lengthwise section, in which one or more working plates, stops or other fixtures may be fitted so that their positions may be changed as desired. The grooves may for example be in the form of a T-groove or a dove-tail groove. To make possible the use of further sliding riders acting as supports there is at least one groove 36 and 37 of the right form on the outer side 35, facing outwards and away from the middle of the table frame. Work supports or clamps may be fitted in these grooves as well.

The lengthwise section or girder 4 that is designed for the present invention so that it makes the desired function possible, is generally like a downwardly opening letter U with the base of the U forming the back 6 of the lengthwise section and at the inner side 9, facing the middle of the bench frame, it has a downwardly running step forming the lengthwise groove 31 with the round guide 59 at one side of it. The two downwardly pointing arms of the letter U with the back 6 of the section at their top ends have an inner side part 38 and an outer side part 39 of the lengthwise section 4, the inner side part 39 under the lengthwise groove 31 taking the form of a guide groove 62 and under it there is a downwardly opening first T-groove 32 with a further, inwardly opening second T-groove 33 further to the side and at a lower level. The outer side part 39 has an upwardly opening third T-groove 36 that is at a lower lever than the back 6 of the section and at a still lower level there is a fourth T-groove 37 opening to the side and outwards. Under this groove 36 there is a downwardly opening L-groove 41. Furthermore there is a sloping wall 44 in the U-opening 42 of the lengthwise section 4 against which the bench legs 2 are supported. This sloping wall 44 on the one hand is used for fixing the angle of the bench legs 2 and on the other hand gives a sort of tongue-and-groove interlocking system for fixing the bench legs 2 firmly in place. The lengthwise section 4, that has a generally complex structure, is best made of extruded aluminum. In addition to its low weight such material has a high strength. As a further measure for cutting down the weight of the section it may have hollow spaces 45 in it. Between such spaces 45 and the grooves there are two solid flanges 63, that in their middle part have two threaded holes 64. It is by using these threaded holes 64 that the cross sections 5 are screwed onto the lengthwise sections 4. The cross or transverse sections 5 may as well be designed with sliding guides and stops or riders and the like. Furthermore to make it simpler for the size of the bench 1 to be changed, the cross sections 5 are made in a number of different standard sizes.

Figure 5:
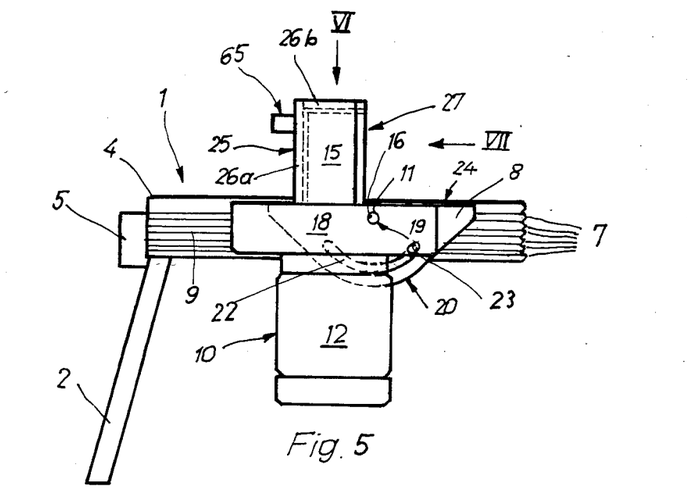
FIG. 5 is a partly diagrammatic side view of a further possible form of the bench in keeping with the present invention.

In FIG. 5 it is possible to see a form of the bench 1 in keeping with the present invention, in which the driving unit 10 is lowered to a home position under the plane 24 of the bench in which the shaft is upright. In this figure the eye of the reader is directed away from the inner side of the section frame 3 and looking towards a lengthwise section 4. The inner side 9 of the lengthwise section is for this reason to be seen with its edges 7 in a side view 1. At the lengthwise section 4 a rocking cradle 8 is kept in place in the way noted, in which the driving unit 10 is able to be rocked about the trunnion axis 11. The lower arm 18, supporting the driving unit 10, of the cradle 8 has in this form of the invention the form of a round-off trapezium with its narrow side lowermost. The rounded edge 20 is in this case centered on the hole 19, that takes up the trunnion 16 of the driving unit 10 so that it may be turned. The driving unit 10 is in a home position, in which its shaft is normal in relation to the plane 24 of the bench. It will be noted that the pin 23 is in this case in the end part of the slot 22. On the shaft of the driving unit a sleeve suppot 15 is mounted, that may have a grinding or abrasive sleeve thereon forming an abrasive roller. In keeping with a further preferred development of the invention this tool is covered by a housing of the right form that may be fixed on the cradles 8 or on the driving unit so that when it is in operation only a part of the surface of the grinding roller will be outside the housing. As will be seen from FIG. 2, the housing may have the simple form of a right-angle like a bookend, or in keeping with the form of the invention to be seen in FIGS. 5 to 7 it may take on the form of a housing that is shut off on three sides and at the top so that it is placed right round the tool. In this event the housing will have two wings 30 on the two sides of the tool 15, such wings functioning as stop faces when the tool is upright and functioning as support faces for a piece of work when the tool is on the level. The wings 30 may in this respect be placed in a single plane so as to have the function of a common stop or support surface. It is particularly in the case when the shaft of the driving unit 10 is in the upright position and when using a chip-cutting or machining tool that it is furthermore possible to have a design in which the wings are parallel to and spaced from each other. This makes it possible for a layer to be cut from the surface of a workpiece to the same depth from one end of the work to the other, the depth of cutting being equal to the difference in height between the wings 30. In the working example seen in FIGS. 5 to 7 the wings 30 are joined up with two side walls 26, a back wall 26a and a top cover plate 26b to take the form of a guard hood 25 for the tool 15 so that same is shut off on all sides. In its only at the front side 26 that the guard hood 26 is open so that the user is able to get at the sleeve support 15. This sleeve support is spaced from the side walls 26 and back wall 26a in the guard hood 25 in such a way that its working outer face 28 extends out of the guard hood 25 to a small degree. The user of the bench is for this reason not able to put his or her hand on the tool.

Figure 6:
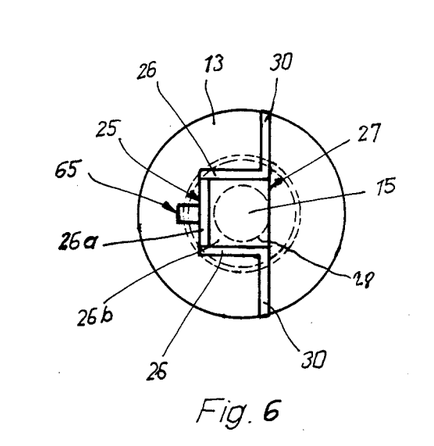
FIG. 6 is a view looking down onto the driving unit of the bench in keeping with FIG. 5 and in the direction VI of FIG. 5.
Figure 7:
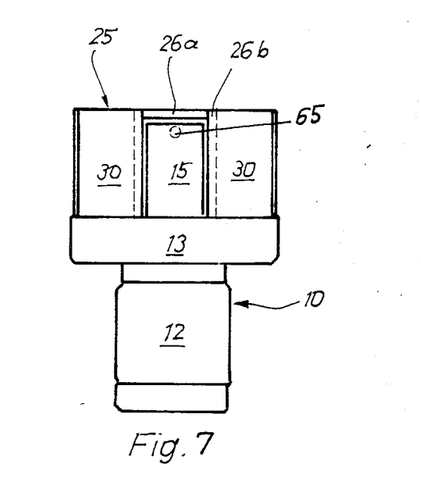
FIG. 7 is a side view of the driving unit of the bench as in FIG. 5 looking in the direction of the arrow VII of FIG. 5.

The wings 30 of the guard hood have the function of a stop for the work that is to be processed. In keeping with a preferred further development of the invention the guard hood 25 is fitted with a means for aspirating dust (as produced by grinding) and/or wetting the tool with a cooling or lubricant liquid. The connection of the unit needed in this respect is by way of a connector 65, that may be placed for example on the back wall 26a of the guard hood 25. By using an aspiration means working conditions become cleaner and the bench is much pleasanter to use.

Tools that may be used specially effectively with the bench 1 of the present invention are for example so-called grinding porcupines in the form of an abrasive sleeve support with a cylindrical core and a stiffly elastic covering fixed thereon, on which a grinding sleeve may be plugged. The stiffly elastic covering may be made of solid rubber or of separate suckers made of rubber. Such a stiff, elastic covering makes it possible for grinding and buffing to take place with a resilient, elastic effect. On the other hand the driving unit 10 may best be made with a face plate 14 on its output shaft so that an abrasive element may be supported thereon and on the outer edge thereof it will be possible for an abrasive ring to be fixed for a cutting or sawing function. Because the driving unit 10 is able to be rocked about the trunnion axis 11 a great number of different sorts of operations may be undertaken. For example, lengths of work may be cut off from stock or may be slotted and then ground and buffed, such steps being able to be undertaken quickly one after the other without any, or with only very little adjustment to the set up of the bench 1. It is possible for surfaces to be ground, for edges to be ground at an angle, for example when mitering, and for rounded surfaces to be ground and buffed. A large number of different materials, as for example wood, leather, synthetic resin, polymethyl acrylate resin, fiber glass, stone and metal may be worked.

We claim:

1. A bench comprising a frame made up of lengths of sections, bench legs fitted to said frame and dependent therefrom, two segment-like cradles and at least one bench top mounted on said frame and able to be slidingly moved thereon with said cradles, and a driving unit mounted on said cradles for rocking motion, said bench top being designed for use as a work support, said frame having two first parallel sections at two sides of said frame with one of said cradles being mounted on each of said first sections, said driving unit having trunnions for rocking motion thereof about a common trunnion axis, and said trunnions being fitted respectively to said cradles.

2. The bench as claimed in claim 1 wherein said driving unit is mounted in said cradles for rocking motion between two home positions thereof, said driving unit having an output shaft that is normal to a plane of said bench top in one such home position and parallel thereto in the other of said home positions.

3. The bench as claimed in claim 2 wherein said driving unit is able to be moved beyond said home positions to a limited degree, said bench further comprising means for locking said driving unit in a number of different angle settings thereof in relation to said bench top.

4. The bench as claimed in claim 1 wherein said trunnions are journaled in holes in said cradles, said bench further comprising at least one guide element placed on one of said cradles so as to be centered on said holes, and an adjustment part running in said guide element, said adjustment part being part of said driving unit and functioning for locking said driving unit in a desired position thereof.

5. The bench as claimed in claim 1 wherein said cradle is generally L-like and said bench comprises a guide rail as part of one such first section, said cradle having a top arm running in said guide rail and having a lower arm bent down therefrom and having a hole and a curved slot centered on said hole, said driving unit having a pin running into said slot.

6. The bench as claimed in claim 5 comprising a locking screw running on a screw thread on said pin for locking against said cradle.

7. The bench as claimed in claim 5 wherein said slot has a length equal to between 90° and 120°.

8. The bench as claimed in claim 5 wherein said slot has separate notches therein representative of different positions of indexing of said driving unit.

9. The bench as claimed in claim 5 having an angle scale on said cradle and a pointer on said driving unit for use with said scale in giving a reading for the angle of the driving unit.

10. The bench as claimed in claim 5 wherein each said first section is stepped so that a lengthwise groove is formed therein, said groove being limited on one side by a round guide that is at a lower level than a top face of the bench, said top arm of said cradle being formed with a claw-like part for running on said round guide.

11. The bench as claimed in claim 10 wherein said claw-like part is rested on said round guide at a lower level than said top face of said bench, it functioning as a support face for a bent down edge of said bench top.

12. The bench as claimed in claim 11 wherein said bent down edge of said bench top is designed to be fitted into said lengthwise groove, the bench top in this position then forming a common bench top plane with the back part of one said first section.

13. The bench as claimed in claim 10 comprising an mounting ear that may be fitted into a guide groove on the inner side of said first section under the round guide, said guide groove being generally parallel to and spaced from the top arm of said cradle, said ear being designed to be mounted on said cradle.

14. The bench as claimed in claim 13 wherein on an inner side of said first section there is at least one further groove that is designed to have fixtures fitted thereinto so that same may be slidingly moved along it.

15. The bench as claimed in claim 14 wherein on an outer side of said first section there is at least one groove designed to have fixtures fitted thereto, that may be moved along it.

16. The bench as claimed in claim 10 wherein said first section generally has the form of a letter U with two arms running downwards from a base, said base forming a back of said section, an inner side of said section facing a middle of said frame being downwardly stepped so that a lengthwise groove limited by a round guide is formed, said arms of said section running down from said base forming an inner side part and an outer side part of the section, the inner side part having a guide groove and further downwards therefrom a first downwardly opening T-groove, further downwards and outwards a second T-groove opening inwards, said outer side part having an upwardly opening third T-groove at a lower level than said base and at a lower level than said third T-groove said section has a fourth T-groove opening outwards to the side, there being a downwardly opening L-groove at a downwardly turned end face of the said section.

17. The bench as claimed in claim 16 wherein between the arms of said section running down from the base thereof said section is formed with a sloping wall against which top ends of said bench legs are rested.

18. The bench as claimed in claim 17 wherein said section is made of extruded aluminum.

* * * * *